(12) United States Patent
Arbabi et al.

(10) Patent No.: US 12,067,161 B1
(45) Date of Patent: Aug. 20, 2024

(54) ULTRASONIC TRANSDUCERS FOR POSITION TRACKING

(71) Applicant: Apple Inc., Cupertino, CA (US)

(72) Inventors: Ehsan Arbabi, Saratoga, CA (US);
Patrick R. Gill, Los Altos, CA (US);
Avery L. Wang, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 678 days.

(21) Appl. No.: 17/234,659

(22) Filed: Apr. 19, 2021

Related U.S. Application Data

(60) Provisional application No. 63/014,651, filed on Apr. 23, 2020.

(51) Int. Cl.
| | | |
|---|---|---|
| *G06F 3/01* | (2006.01) | |
| *G01S 7/521* | (2006.01) | |
| *G01S 15/00* | (2020.01) | |
| *G01S 15/42* | (2006.01) | |
| *G01S 15/88* | (2006.01) | |

(52) U.S. Cl.
CPC ............. *G06F 3/013* (2013.01); *G01S 7/521* (2013.01); *G01S 15/003* (2013.01); *G01S 15/42* (2013.01); *G01S 15/88* (2013.01)

(58) Field of Classification Search
CPC .......... G06F 3/012; G06F 3/013; G06F 3/014; G01S 7/52085; G01S 7/52092; G01S 7/58; G01S 7/64; G01S 7/521; G01S 13/66; G01S 13/68; G01S 13/70; G01S 13/72; G01S 13/726; G01S 15/42; G01S 15/50; G01S 15/66; G01S 15/89; G02B 27/0107; G02B 27/0136; G02B 27/0138; G02B 27/0163; G02B 27/0172; G02B 27/0178

See application file for complete search history.

(56) References Cited

U.S. PATENT DOCUMENTS

| | | | |
|---|---|---|---|
| 6,923,066 B2 | 8/2005 | Ogawa | |
| 7,727,156 B2 | 6/2010 | Angelsen et al. | |
| 8,500,638 B2 | 8/2013 | Jinde et al. | |
| 10,303,246 B2 | 5/2019 | Vidal et al. | |
| 10,908,279 B2 | 2/2021 | Scally et al. | |
| 2011/0213248 A1* | 9/2011 | Murakami | A61B 8/12 601/2 |
| 2017/0261610 A1* | 9/2017 | Scally | G01S 15/50 |

(Continued)

*Primary Examiner* — Sultan Chowdhury
(74) *Attorney, Agent, or Firm* — Treyz Law Group, P.C.; Kendall P. Woodruff

(57) ABSTRACT

Ultrasonic transducers may be used to track the position of an object. For example, eyewear such as a pair of glasses or other head-mounted device may use ultrasonic transducers to track a user's eye position and gaze direction. To increase positioning accuracy over short-range distances, an array of ultrasonic transducers with different center frequencies may be formed on a common substrate. The closely spaced ultrasonic transducers with relatively small individual bandwidths may be used to simulate a single transducer with a larger bandwidth. Control circuitry may adjust the phases of the transducers in the array to steer the ultrasonic signal beam towards the user's eye and/or to receive an ultrasonic signal beam from the direction of the user's eye. The control circuitry may use time delay and/or phase delay measurement techniques to determine a distance and/or direction to the user's eye using the ultrasonic transducer arrays.

20 Claims, 7 Drawing Sheets

(56) References Cited

U.S. PATENT DOCUMENTS

2019/0331919 A1* 10/2019 Huo .................... H04N 23/815
2020/0064635 A1*  2/2020 Franklin ............ G02B 27/0955
2020/0174284 A1*  6/2020 Chan ...................... G02B 7/023
2020/0282424 A1*  9/2020 Oralkan ................ B81B 3/0083

* cited by examiner

ULTRASONIC TRANSDUCERS FOR POSITION TRACKING

This application claims the benefit of U.S. provisional patent application No. 63/014,651, filed Apr. 23, 2020, which is hereby incorporated by reference herein in its entirety.

FIELD

This relates generally to wearable devices, and, more particularly, to wearable devices such as head-mounted devices and other eyewear.

BACKGROUND

Head-mounted devices and other eyewear may use gaze tracking circuitry to track a user's gaze.

It can be challenging to design gaze tracking circuitry that performs satisfactorily. If care is not taken, the gaze tracking circuitry may produce inaccurate measurements or may exhibit other performance limitations such as excessive power consumption.

SUMMARY

Ultrasonic transducers may be used to track the position of an object. For example, eyewear such as a pair of glasses or other head-mounted device may use ultrasonic transducers to track a user's eye position and gaze direction. To increase positioning accuracy over short-range distances, an array of ultrasonic transducers with different center frequencies may be formed on a common substrate. The closely spaced ultrasonic transducers with relatively small individual bandwidths may be used to simulate a single transducer with a larger bandwidth.

Control circuitry may adjust the phases and/or amplitudes of the transducers in the array to steer the ultrasonic signal beam towards the user's eye (and away from direct paths to receiving transducer arrays, if desired) and/or to receive a reflected ultrasonic signal beam from the direction of the user's eye. The control circuitry may use time delay measurement techniques, phase delay measurement techniques, and/or amplitude measurement techniques to determine a distance and/or direction to the user's eye using the ultrasonic transducer arrays.

The transducer arrays may include piezoelectric micromachined ultrasonic transducers, capacitive micromachined ultrasonic transducers, and/or other suitable type of ultrasonic transducers formed in a common substrate. The transducers may be provided with different center frequencies by forming cavities with different depths, cavities with different diameters, and/or cavities with different surface features.

Control circuitry may control each transducer in the array independently of one another, and/or the control circuitry may control subsets of transducers in the array (e.g., subsets with the same center frequency) independently of other sets of transducers in the array. One or more sets of transducers with the same center frequency may be placed adjacent to one another in the array to help disambiguate phase information. The remaining transducers in the array that are not used for phase disambiguation may be spaced farther apart from other transducers of the same center frequency.

DETAILED DESCRIPTION

Ultrasonic transducers may be used to track the position of one or more objects of interest. For example, eyewear such as a pair of glasses or other head-mounted device may use one or more ultrasonic transducers to track a user's eye position and gaze direction. The ultrasonic transducers may include capacitive micromachined ultrasonic transducers, piezoelectric micromachined transducers, and/or other suitable ultrasonic transducers for emitting and/or detecting acoustic signals. To increase positioning accuracy over short-range distances, multiple ultrasonic transducers with different center frequencies may be arranged in an array. An array of closely spaced ultrasonic transducers with relatively small individual bandwidths may be used to simulate a single transducer with a much larger bandwidth, without sacrificing performance. When the transducers in the array are properly phased, the array may be able to generate an ultrasonic signal pulse with a much shorter pulse length than that which could be produced with a single transducer alone. Being able to generate short ultrasonic signal pulses may be especially beneficial for determining short-range distances and for resolving two objects that are closely spaced together. For example, a phased transducer array may be able to resolve objects that are as close as one wavelength apart or other suitable distance.

If desired, the ultrasonic transducers with different center frequencies may be operated independently of one another to independently measure signals at different frequencies. The independently measured signals can then be used to estimate time of flight and path length to the desired level of accuracy.

In arrangements where the ultrasonic transducers are used for gaze tracking in a pair of glasses or other eyewear, multiple arrays of ultrasonic transducers may be distributed at different locations around each of the user's eyes. Each array may include ultrasonic transducers with different center frequencies. One or more of the arrays may emit ultrasonic signals towards the user's eye. The ultrasonic signals may reflect off of the user's eye and may be detected by one or more of the other arrays. Control circuitry may gather data from the transducer arrays to determine the user's eye position and/or gaze direction (e.g., using time delay measurement techniques, phase delay measurement techniques, amplitude measurement techniques, and/or other suitable measurement techniques).

Figure 1:
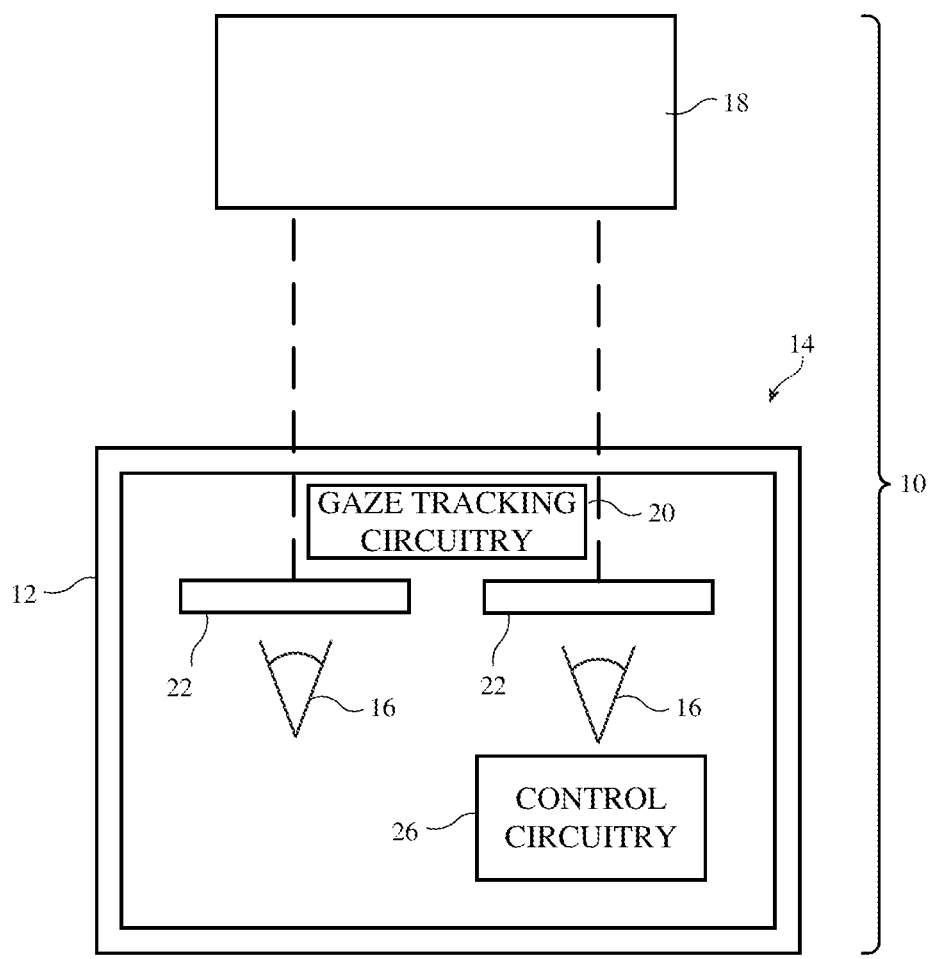
FIG. 1 is a diagram of illustrative system that includes eyeglasses with adjustable lenses and gaze tracking circuitry in accordance with an embodiment.

An illustrative system having a device with one or more ultrasonic transducers is shown in FIG. 1. System 10 may include a head-mounted device such as eyeglasses 14 (sometimes referred to as glasses 14, head-mounted device 14, eyewear 14, etc.). Glasses 14 may include one or more optical systems such as adjustable lens components 22 mounted in a support structure such as support structure 12. Structure 12 may have the shape of a pair of eyeglasses (e.g., supporting frames), may have the shape of goggles, may form a housing having a helmet shape, or may have other configurations to help in mounting and securing the components of glasses 14 on the head of a user.

Adjustable lens components 22 may form lenses that allow a viewer (e.g., a viewer having eyes 16) to view external objects such as object 18 in the surrounding environment. Glasses 14 may include one or more adjustable lens components 22, each aligned with a respective one of a user's eyes 16. As an example, lens components 22 may include a left lens 22 aligned with a viewer's left eye and may include a right lens 22 aligned with a viewer's right eye. This is, however, merely illustrative. If desired, glasses 14 may include adjustable lens components 22 for a single eye.

Adjustable lenses 22 may be corrective lenses that correct for vision defects. For example, eyes 16 may have vision defects such as myopia, hyperopia, presbyopia, astigmatism, higher-order aberrations, and/or other vision defects. Corrective lenses such as lenses 22 may be configured to correct for these vision defects. Lenses 22 may be adjustable to accommodate users with different vision defects and/or to accommodate different focal ranges. For example, lenses 22 may have a first set of optical characteristics for a first user having a first prescription and a second set of optical characteristics for a second user having a second prescription. Glasses 14 may be used purely for vision correction (e.g., glasses 14 may be a pair of spectacles) or glasses 14 may include displays that display virtual reality or augmented reality content (e.g., glasses 14 may be a head-mounted display). In virtual reality or augmented reality systems, adjustable lens components 22 may be used to move content between focal planes from the perspective of the user. Arrangements in which glasses 14 are spectacles that do not include displays are sometimes described herein as an illustrative example.

Glasses 14 may include control circuitry 26. Control circuitry 26 may include processing circuitry such as microprocessors, digital signal processors, microcontrollers, baseband processors, image processors, application-specific integrated circuits with processing circuitry, and/or other processing circuitry and may include random-access memory, read-only memory, flash storage, hard disk storage, and/or other storage (e.g., a non-transitory storage media for storing computer instructions for software that runs on control circuitry 26).

Glasses 14 may include input-output circuitry such as eye state sensors, range finders disposed to measure the distance to external object 18, touch sensors, buttons, microphones to gather voice input and other input, sensors, and other devices that gather input (e.g., user input from viewer 16) and may include light-emitting diodes, displays, speakers, and other devices for providing output (e.g., output for viewer 16). Glasses 14 may, if desired, include wireless circuitry and/or other circuitry to support communications with a computer or other external equipment.

Control circuitry 26 may also control the operation of optical elements such as adjustable lens components 22. Adjustable lens components 22, which may sometimes be referred to as adjustable lenses, adjustable lens systems, adjustable optical systems, adjustable lens devices, tunable lenses, etc., may include fluid-filled variable lenses, may include Alvarez lenses, and/or may contain electrically adjustable material such as liquid crystal material, volume Bragg gratings, or other electrically modulated material that may be adjusted to produce customized lenses. Each of components 22 may contain an array of electrodes that apply electric fields to portions of a layer of liquid crystal material or other voltage-modulated optical material with an electrically adjustable index of refraction (sometimes referred to as an adjustable lens power or adjustable phase profile). By adjusting the voltages of signals applied to the electrodes, the index of refraction profile of components 22 may be dynamically adjusted. This allows the size, shape, and location of the lenses formed within components 22 to be adjusted.

Glasses 14 may include gaze tracking circuitry such as gaze tracking circuitry 20. Gaze tracking circuitry 20 may include one or more sensors for tracking a user's eyes 16. For example, gaze tracking circuitry 20 may include one or more digital image sensors (e.g. visible image sensors and/or infrared image sensors that gather images of the user's eyes), ultrasonic sensors, light-based sensors such as lidar (light detection and ranging) sensors, and/or other suitable sensors for tracking the location of a user's eyes. As an example, gaze tracking circuitry 20 may be used by control circuitry 26 to gather eye information such as cornea location, pupil location, gaze direction, and/or other information about the eye(s) of the viewer. The locations of the viewer's pupils and the locations of the viewer's pupils relative to specular glints from light sources with known positions or the rest of the viewer's eyes may be used to determine the locations of the centers of the viewer's eyes (i.e., the centers of the user's pupils) and the direction of view (gaze direction) of the viewer's eyes. If desired, gaze tracking circuitry 20 may also include a wavefront sensor that measures the aberrations of a user's eyes so that control circuitry 26 can adjust the optical properties of lens component 22 to correct the user-specific aberrations detected by the wavefront sensor.

Gaze tracking information may be used as a form of user input, may be used to determine where, within an image, image content resolution should be locally enhanced in a foveated imaging system (e.g., in arrangements where device 14 is a head-mounted display), and/or may be used to determine where, within one or both of lenses 22, vision correction should be locally enhanced in a foveated lens arrangement. In a foveated lens arrangement, control circuitry 26 may dynamically adjust lens components 22 so that the optical properties of portions of lens components 22 that align with a user's gaze are different than the optical properties of portions of lens components 22 that are outside of the user's gaze. For example, portions of lens components 22 that align with a user's gaze may be optically modulated to produce a first lens power, while the remaining portions of lens components 22 may be left optically unmodulated, may be optically modulated to produce a second lens power magnitude that is less than the first lens power magnitude, and/or may be optically modulated to produce a phase profile that is less spatially varied than the phase profile of portions of lens components 22 within the user's gaze. Control circuitry 26 may gather eye information from gaze tracking circuitry 20 and may adjust the optical properties of lens components 22 accordingly.

Figure 2:
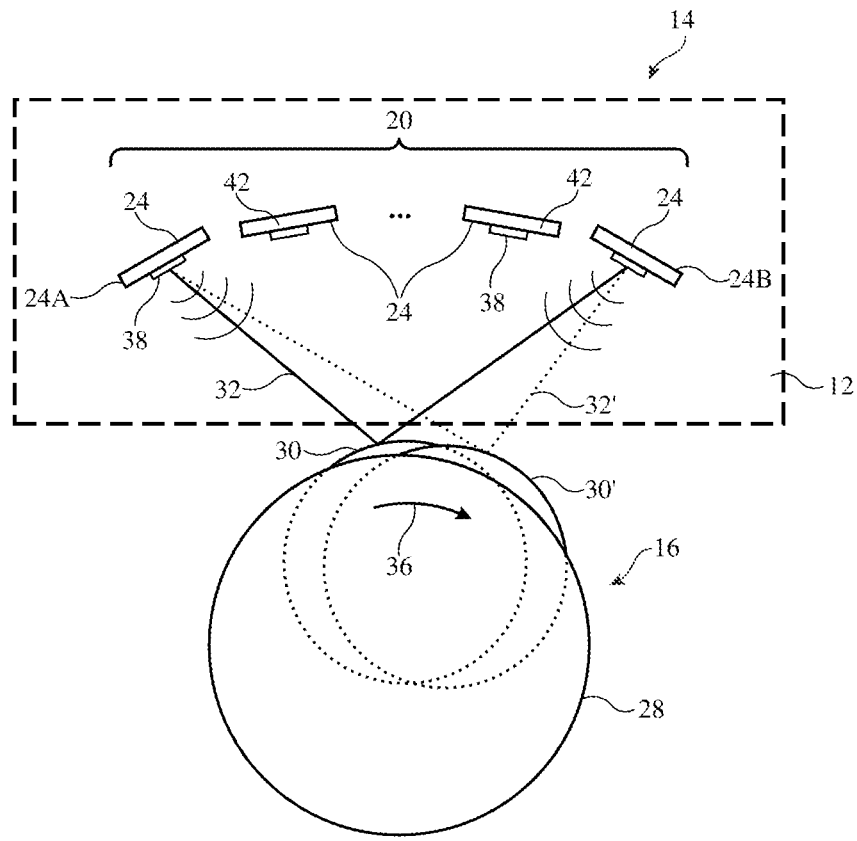
FIG. 2 is a top view of illustrative gaze tracking circuitry in accordance with an embodiment.

FIG. 2 is a top view of glasses 14 showing how gaze tracking circuitry may be used to track a user's gaze. As shown in FIG. 2, gaze tracking circuitry 20 in glasses 14 may include one or more arrays 24 of ultrasonic transducers. Each array 24 may include multiple ultrasonic transducers 38 on a substrate such as substrate 42. Ultrasonic transducers 38 within each array 24 may have different center frequencies such that, when used together, the array can collectively achieve the positioning accuracy of a wideband ultrasonic transducer without experiencing the reduction in quality factor that would normally result from a single broadband ultrasonic transducer. Arrays 24 may be mounted in support structure 12 and may be distributed at different locations around the user's eye 16. There may be any suitable number of arrays 24 in glasses 14 (e.g., one, two, three, four, five, six, ten, fifteen, twenty, more than twenty, less than twenty, etc.), and each array 24 may include any suitable number of transducers 38 (e.g., five, eight, ten, fifteen, twenty, fifty, one hundred, two hundred, less than two hundred, more than two hundred, etc.).

During operation, one or more of arrays 24 such as array 24A may be used to emit ultrasonic signals 32. The ultrasonic signals 32 may reflect off of a user's eye 16 (e.g., may reflect off of cornea 30 of the user's eye 16). One or more of arrays 24 such as array 24B may be used to detect ultrasonic signals 32 after the signals reflect off of the user's cornea 30. Using time-of-flight measurement techniques, control circuitry 26 may be used to determine the time that it takes for the emitted signal 32 to reflect back from eye 16, which may in turn be used to determine the distance to eye 16 (e.g., the distance to the point of specular reflection on cornea 30). As eye 16 rotates, control circuitry 26 may continue to monitor changes in distance to the point of specular reflection on the user's eye. For example, as the user's eye 16 moves in direction 36, ultrasonic signals 32' from transducer array 24A may reflect off of cornea 30' and may be detected by array 24B. The time-of-flight of signals 32' may be different from the time-of-flight of signals 32, due to the change in distance to the point of specular reflection of the user's eye 16. Control circuitry 26 may monitor these changes in distance to determine the direction of the user's gaze during the operation of glasses 14. If desired, the same array 24 may be used to emit and detect signals 32. Arrangements in which multiple arrays 24 emit signals 32 and/or where multiple arrays 24 detect signals 32 may also be used. The example of FIG. 2 is merely illustrative.

If desired, one or more of arrays 24 may be a phased transducer array. In a phased ultrasonic transducer array, beam steering techniques may be used in which ultrasonic signal phase and/or magnitude for each transducer in array 24 are adjusted to perform beam steering. Beam steering may be used to "illuminate" a particular area of interest with ultrasonic signals 32. Beam steering may also be used to avoid illuminating certain areas with ultrasonic signals 32 (e.g., to avoid directly illuminating other arrays 24 and/or to avoid illuminating certain parts of the user's face). For example, a phased ultrasonic transducer array 24 may be configured to emit a concentrated beam of ultrasonic signals 32 that strikes cornea 30 but does not strike the user's eye brow. This type of beam steering arrangement may help improve gaze tracking accuracy by avoiding detecting significant reflections from surfaces around the user's eye 16.

The use of time-of-flight based measurement techniques is merely illustrative. If desired, other time-based, amplitude-based, and/or phase-based measurement schemes such as time difference of arrival measurement techniques, angle of arrival measurement techniques, triangulation methods, and/or other suitable measurement techniques may be used to determine a location of the user's eye 16 using ultrasonic sensor arrays 24. Arrangements in which other sensors such as visible light cameras, infrared light cameras, and/or proximity sensors (e.g., infrared proximity sensors or other proximity sensors) are used to gather eye location information, glint location information, gaze direction information, pupil shape information, and/or other eye information may also be used.

Figure 3:
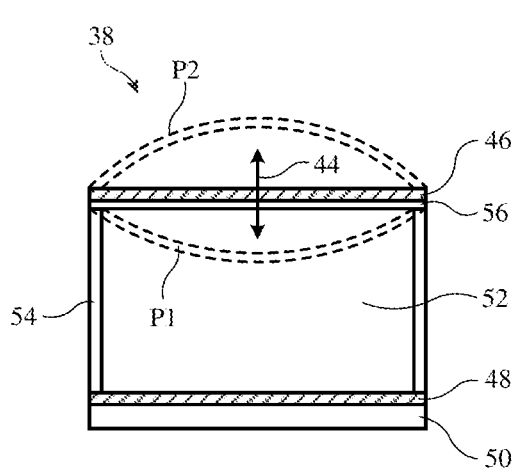
FIG. 3 is a cross-sectional side view of an illustrative capacitive ultrasonic transducer that may be used in gaze tracking circuitry in accordance with an embodiment.
Figure 4:
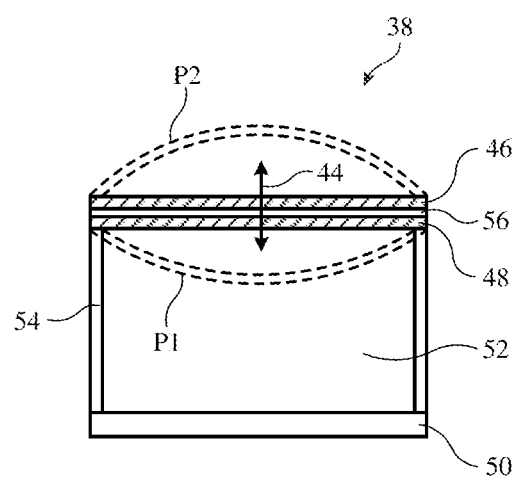
FIG. 4 is a cross-sectional side view of an illustrative piezoelectric ultrasonic transducer that may be used in gaze tracking circuitry in accordance with an embodiment.

FIGS. 3 and 4 are cross-sectional side views of illustrative ultrasonic transducers of the type that may be included in gaze tracking circuitry 20.

In the example of FIG. 3, ultrasonic transducer 38 is a capacitive micromachined ultrasonic transducer. Ultrasonic transducer 38 of FIG. 3 includes a movable membrane such as membrane 56, a substrate 50 (e.g., a semiconductor substrate such as a silicon substrate and/or any other suitable type of substrate), and sidewalls 54 that together define a cavity such as cavity 52. A pair of capacitive electrodes such as first electrode 46 on membrane 56 and second electrode 48 on substrate 50 may be located on opposing sides of cavity 52. When control circuitry 26 applies an alternating voltage across electrodes 46 and 48, the resulting electrostatic force causes membrane 56 to oscillate up and down in directions 44 (see, e.g., membrane 56 oscillating between positions P1 and P2 in FIG. 3), thereby generating an acoustic wave having a frequency that corresponds to the frequency at which membrane 56 oscillates. Transducer 38 may also be used to detect ultrasonic waves, if desired. In particular, incident ultrasonic waves may cause membrane 56 to oscillate, which in turn may cause a change in capacitance across electrodes 46 and 48. Control circuitry 26 may measure this change in capacitance to determine the frequency, amplitude, and/or phase of the incident ultrasonic waves.

In the example of FIG. 4, ultrasonic transducer 38 is a piezoelectric micromachined ultrasonic transducer. Ultrasonic transducer 38 of FIG. 4 includes a movable membrane such as membrane 56, a substrate 50 (e.g., a semiconductor substrate such as a silicon substrate and/or any other suitable type of substrate), and sidewalls 54 that together define a cavity such as cavity 52. In a piezoelectric transducer arrangement, membrane 56 is formed from or coupled to a piezoelectric material. A pair of electrodes such as first electrode 46 and second electrode 48 may be located on opposing sides of membrane 56. Control circuitry 26 may apply an alternating voltage across electrodes 46 and 48 which excites the piezoelectric material in membrane 56, causing membrane 56 to oscillate up and down in directions 44 (see, e.g., membrane 56 oscillating between positions P1 and P2 in FIG. 4), thereby generating an acoustic wave having a frequency that corresponds to the frequency at which membrane 56 oscillates. Transducer 38 of FIG. 4 may also be used to detect ultrasonic waves, if desired. In particular, incident ultrasonic waves may cause membrane 56 to oscillate, which in turn causes the piezoelectric material to generate charge. Control circuitry 26 may measure a corresponding change in voltage across electrodes 46 and 48 to determine the frequency, amplitude, and/or phase of the incident ultrasonic waves.

The examples of FIGS. 3 and 4 are merely illustrative. If desired, arrays 24 may include other types of ultrasonic transducers and/or may have ultrasonic transducers with different features and/or different structures from the examples of FIGS. 3 and 4. For example, a piezoelectric transducer 38 may include more than two electrodes and more than one layer of piezoelectric material, if desired (e.g., transducer 38 may include two layers of piezoelectric material and three layers of electrodes, or may include any other suitable number of piezoelectric layers and electrode layers).

Figure 5:
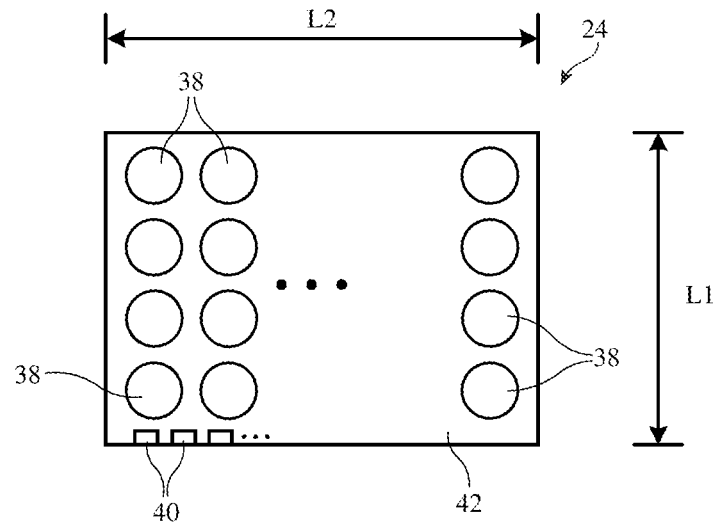
FIG. 5 is a top view of an illustrative array of ultrasonic transducers in accordance with an embodiment.

FIG. 5 is a top view of an illustrative ultrasonic transducer array that may be used in gaze tracking circuitry 20. As shown in FIG. 5, transducer array 24 may include multiple transducers 38 on substrate 42. Array 24 may include transducers 38 with different center frequencies. The center frequency of an ultrasonic transducer may refer to the frequency at the center of the frequency range of which the transducer is capable of operating. For example, array 24 may include transducers with two, three, four, five, six, seven, ten, more than ten, or less than ten center frequencies. The center frequencies of transducers 38 may, for example, be between 750 kHz and 1.25 MHz, between 500 kHz and 1.25 MHz, between 700 kHz and 1 MHz, between 800 kHz and 1.2 MHz, between 900 kHz and 1.1 MHz, between 750 kHz and 1.4 MHz. or between any other suitable frequency range. There may be any suitable number (e.g., one, two, three, four, five, more than five, less than five) of transducers 38 in array 24 for a given center frequency. If desired, each transducer 38 may have one or more natural oscillation frequencies that are used for the excitation or detection of ultrasound waves.

The bandwidth of each individual transducer 38 may be smaller than the collective bandwidth spanned by all of the transducers 38 in array 24. The center frequencies of individual transducers 38 may be selected so that the collective bandwidth of the entire array 24 spans some or all of the desired frequency range (e.g., from 750 kHz to 1.25 MHz, from 700 kHz to 1 MHZ, from 800 kHz to 1.2 MHz, from 900 kHz to 1.1 MHz, from 750 kHz to 1.4 MHz, or any other suitable frequency range). The desired frequency range may depend on the range of distances to be measured. For example, to measure distances to objects that are within a few centimeters (such as a user's eye 16), array 24 may span a frequency range of 750 kHz to 1.25 MHz (as an example).

Substrate 42 may have any suitable dimensions. For example, lateral dimensions L1 and L2 of substrate 42 may be between 2 mm and 2.5 mm, between 1 mm and 1.5 mm, between 1 mm and 3 mm, between 2 mm and 4 mm, and/or other suitable length. Dimensions L1 and L2 may be equal (so that substrate 42 has a square footprint) or unequal (so that substrate 42 has a rectangular footprint), or the footprint of substrate 42 may have other shapes (e.g., circular, oval, round, triangular, etc.).

Transducers 38 may be arranged in an evenly spaced grid of rows and columns on substrate 42, or may be arranged with any other suitable pattern (e.g., unevenly spaced clusters, a random pattern, a non-grid pattern, etc.). The example of FIG. 5 in which transducers 38 have a circular shape is merely illustrative. If desired, transducers 38 may be square, rectangular, oval, round, or any other suitable shape.

In some arrangements, it may be desirable to maximize the amount of space between transducers 38 that share the same center frequency. Maximizing the spacing between commonly configured transducers 38 in array 24 may increase the accuracy of distance measurements made with array 24. Different rules regarding placement of the different subsets of transducers 38 on substrate 42 may be implemented to achieve the desired performance from array 24. As an example, the convex hull of a given set of transducers 38 that share the same center frequency may cover at least 50% of array 24, may cover at least 80% of array 24, or may cover other suitable portions of array 24. As another example, most pairs of transducers 38 that share the same center frequency may be separated by a transducer 38 of a different center frequency. These examples are merely illustrative. In general, transducers 38 may be placed in any suitable arrangement on substrate 42.

Operation of transducers 38 may be controlled by control circuitry 26. Substrate 42 may include interconnects 40 for conveying signals between transducers 38 and control circuitry 26. For example, interconnects 40 may be used to convey driving signals from control circuitry 26 to transducers 38 and to convey sensor signals (e.g., sensor signals associated with ultrasonic waves that are detected by transducers 38) from transducers 38 to control circuitry 26.

If desired, transducers 38 in array 24 may be independently controlled from one another. For example, the frequency, phase, and pulse shape of the driving signal for a given transducer 38 may be different from other transducers 38 in array 24. Each individual transducer 38 in array 24 may be independently controlled with different driving signals, or there may be subsets of transducers 38 (e.g., a subset that share the same center frequency or other suitable subset) that are controlled with the same drive signals but that are independently controlled from other subsets of transducers 38. This is merely illustrative, however. If desired, transducers 38 may not be independently controlled and/or may be controlled with any other suitable driving scheme.

In some arrangements, transducers 38 may be driven by off-chip control circuitry. In this type of arrangement, interconnects 40 may include leads, contact pads, solder and/or other conductive elements for conveying signals between array 24 and control circuitry 26 that is separate from array 24. In other arrangements, substrate 42 may be a multilayer substrate in which transducers 38 are stacked with a control circuitry layer (e.g., an application-specific integrated circuit layer) that includes control circuitry 26. With this type of integrated control circuitry, interconnects 40 may include metal vias or and/or other conductive elements for conveying signals between transducers 38 and control circuitry 26 that is located in a different layer of substrate 42. These examples are merely illustrative. If desired, interconnects 42 may include metal vias for conveying signals between different layers of substrate 42 and may also include contact pads for conveying signals between array 24 and external circuitry.

Figure 6:
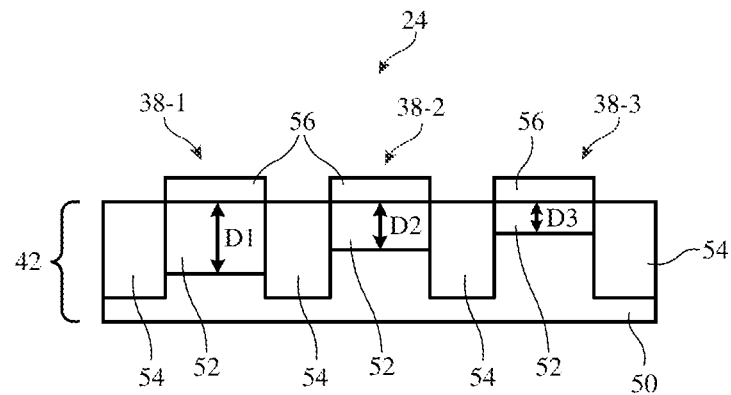
FIGS. 6 ad 7 are cross-sectional side views of illustrative arrays of ultrasonic transducers with different center frequencies in accordance with an embodiment.
Figure 7:
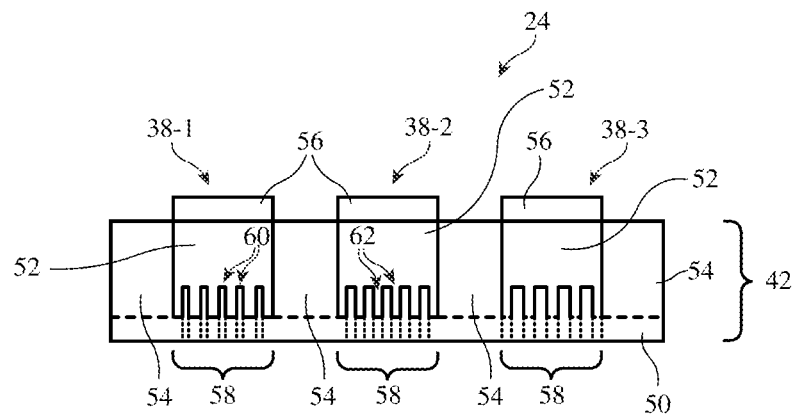

FIGS. 6 and 7 are cross-sectional side views of illustrative arrays of ultrasonic transducers with different center frequencies.

In the example of FIG. 6, array 24 includes transducers with different center frequencies such as transducer 38-1 with a first center frequency, transducer 38-2 with a second center frequency, and transducer 38-3 with a third center frequency. In piezoelectric micromachined ultrasonic transducers, the center frequency is determined at least in part by the dimensions of the cavity. If desired, transducers 38 may be provided with different center frequencies by using cavities 52 with different dimensions (e.g., different depths, different diameters, etc.). In the example of FIG. 6, transducers 38-1, 38-2, and 38-3 have cavities 52 with different respective depths D1, D2 and D3 to achieve the desired set of center frequencies. This may be achieved, for example, by forming membranes 56 on a first substrate (e.g., a substrate forming side walls 54) and bonding the first substrate to a second substrate (e.g., substrate 50) having pads of different heights. Photolithographic techniques (e.g., grayscale lithography) and/or substrate imprinting techniques may be used to create surfaces at different heights on substrate 50. One or both of substrate 50 and side walls 54 may be formed from semiconductor material such as silicon or may be formed from any other suitable material.

In the example of FIG. 7, transducers 38-1, 38-2, and 38-3 have cavities 52 with the same depth but with different surface features such as surface features 58 to create the desired acoustic reflection phase at the center frequency. Surface features 58 may, for example, include protrusions 60 separated by recesses 62. The size, pattern, height, shape, and/or other characteristic of surface features 58 may be varied for different transducers 38 to achieve the desired center frequency. Membranes 56 may be formed on a first substrate such as the substrate forming side walls 54. In one illustrative arrangement, surface features 58 are formed on the substrate that forms side walls 54 (e.g., by processing the substrate to produce surface features 58 and/or by attaching surface features 58 to the substrate). In another suitable arrangement, surface features 58 are formed on substrate 50 (e.g., by processing substrate 50 to produce surface features 58 and/or by attaching surface features 58 to substrate 50), and substrate 50 may be bonded to side walls 54.

The transducers of FIGS. 6 and 7 are merely illustrative examples of the types of structures that may be used to achieve different center frequencies in a transducer array. If desired, other structures may be used to produce an array of transducers with different center frequencies. For example, instead of varying the cavity depth as in the example of FIG. 6, transducers 38 may have uniform cavity depth (e.g., may all have a relatively short cavity depth) but with different lateral cavity dimensions (e.g., different diameters, different lengths and widths, etc.). Arrangements in which both cavity depth and the lateral dimensions of the cavity are varied may also be used. In general, any suitable technique for producing transducers with different center frequencies may be used.

Figure 8:
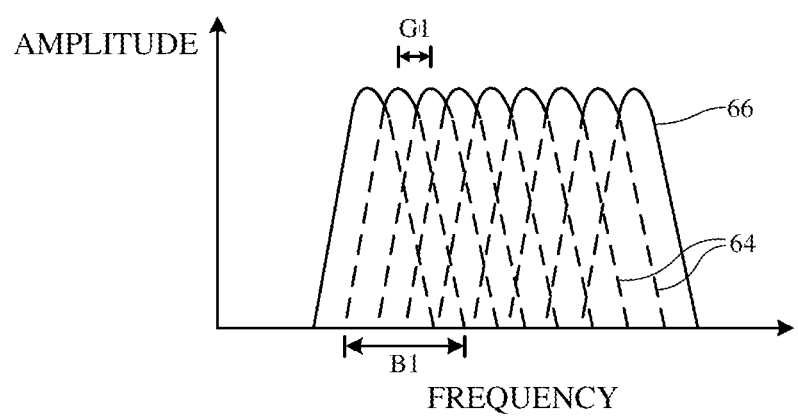
FIG. 8 is a graph of illustrative transfer functions of an array of ultrasonic transducers with a relatively dense frequency coverage in accordance with an embodiment.
Figure 9:
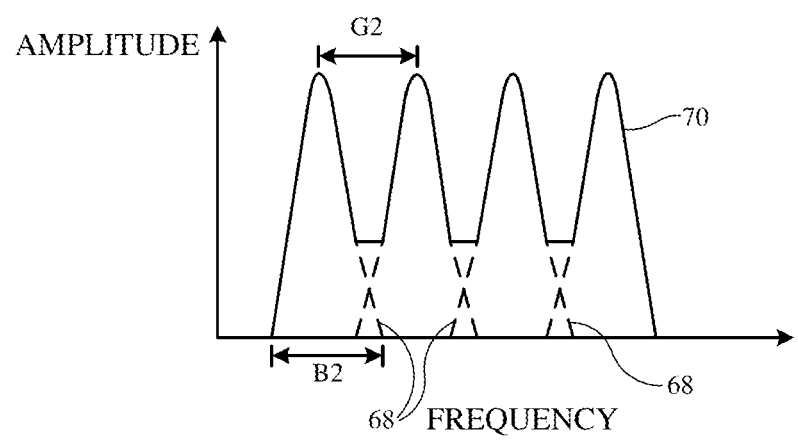
FIG. 9 is a graph of illustrative transfer functions of an array of ultrasonic transducers with a relatively sparse frequency coverage in accordance with an embodiment.

FIGS. 8 and 9 are graphs showing illustrative frequency coverage arrangements for an array of ultrasonic transducers (e.g., an array 24 in gaze tracking circuitry 20).

In the example of FIG. 8, each curve 64 correspond to the transfer function (in the frequency domain) of an associated transducer 38 in a given array 24. Curve 66 corresponds to the overall frequency coverage of the phased array 24 taken as a whole. In this example, the frequency coverage is relatively dense in the sense that the bandwidth B1 of an individual transducer 38 is larger than or comparable to the gap G1 between adjacent center frequencies. The number of transducers 38 with different center frequencies (and thus the number of curves 64 spanning the desired frequency range) may be greater or less than that shown in FIG. 8. When array 24 has a relatively dense frequency coverage of the type shown in FIG. 8, the entire bandwidth of curve 66 may be used efficiently during operation of array 24.

In the example of FIG. 9, each curve 68 corresponds to the transfer function (in the frequency domain) of an associated transducer 38 in a given array 24. Curve 70 corresponds to the overall frequency coverage of phased array 24 taken as a whole. In this example, the frequency coverage is relatively sparse in the sense that the bandwidth B2 of an individual transducer 38 is smaller than the gap G2 between adjacent center frequencies. The number of transducers 38 with different center frequencies (and thus the number of curves 68 spanning the desired frequency range) may be greater or less than that shown in FIG. 9. When array 24 has a relatively sparse frequency coverage of the type shown in FIG. 9, certain portions of the overall bandwidth of curve 70 (e.g., discrete portions centering around the individual center frequencies of transducers 38) may be used more efficiently than other portions during operation of array 24.

The examples of FIGS. 8 and 9 are merely illustrative. If desired, the frequency coverage of arrays 24 may be denser than that shown in FIG. 8, may be sparser than that shown in FIG. 9, or may have a frequency coverage that is sparser than that of FIG. 8 but denser than that of FIG. 9. In general, measurements from an array with relatively dense frequency coverage may have a greater signal-to-noise ratio than measurements from an array with relatively sparse frequency coverage.

Figure 10:
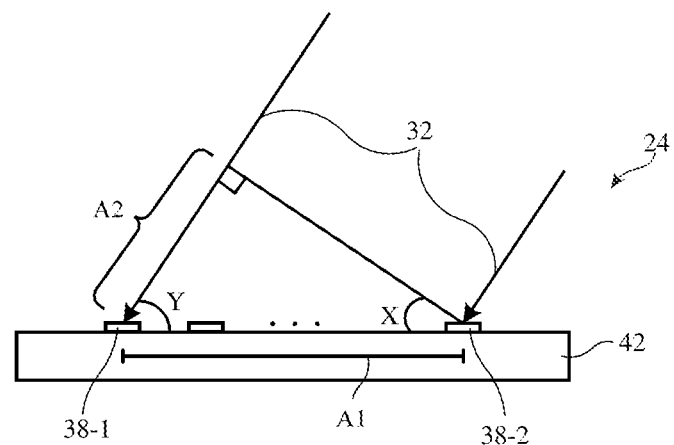
FIG. 10 is a side view of an illustrative array of ultrasonic transducers that may be used to determine the angle of arrival of an incoming acoustic wave in accordance with an embodiment.

FIG. 10 is a schematic diagram showing how angle of arrival (sometimes referred to as direction of arrival) measurement techniques may be used to determine the angle of arrival of incident ultrasonic signals. As shown in FIG. 10, array 24 may include multiple transducers 38 (e.g., a first transducer 38-1 and a second transducer 38-2). Transducers 38-1 and 38-2 may each receive an ultrasonic signal 32 after it reflects off of the user's eye 16 (FIG. 2). Transducers 38-1 and 38-2 may be laterally separated by a distance A1, where transducer 38-1 is farther away from the user's eye than transducer 38-2 (in the example of FIG. 10). Therefore, ultrasonic signal 32 travels a greater distance to reach transducer 38-1 than it does to reach transducer 38-2. The additional distance between the user's eye and transducer 38-1 is shown in FIG. 10 as distance A2. FIG. 10 also shows angles X and Y (where X+Y=90°).

Distance A2 may be determined as a function of angle Y or angle X (e.g., $A2=A1\sin(X)$ or $A2=A1\cos(Y)$). Distance A2 may also be determined as a function of the phase difference between the signal received by transducer 38-1 and the signal received by transducer 38-2 (e.g., $A2=(\Delta\varphi\lambda)/(2\pi)$, where $\Delta\varphi$ is the phase difference between the signal received by transducer 38-1 and the signal received by transducer 38-2 and $\lambda$ is the wavelength of the received signal 32). Control circuitry 26 may include phase measurement circuitry coupled to each transducer 38 to measure the phase of the received signals and identify a difference in the phases ($\Delta\varphi$). The two equations for A2 may be set equal to each other (e.g., $A1\sin(X)=(\Delta\varphi\lambda)/(2\pi)$) and rearranged to solve for angle X (e.g., $X=\sin^{-1}((\Delta\varphi\lambda)/(2\pi A1))$) or may be rearranged to solve for angle Y. As such, the angle of arrival may be determined (e.g., by control circuitry 26) based on the known (predetermined) distance between transducer 38-1 and transducer 38-2, the detected (measured) phase difference between the signal received by transducer 38-1 and the signal received by transducer 38-2, and the known wavelength or frequency of the received signals 32.

Because phase measurements are restricted to an interval between negative pi and positive pi, phase wrapping may occur which can, if care is not taken, lead to ambiguous phase difference measurements. Phase disambiguation may be achieved by performing non-uniform sampling and/or by clustering certain transducers together within array 24. This type of arrangement is illustrated in FIG. 11.

Figure 11:
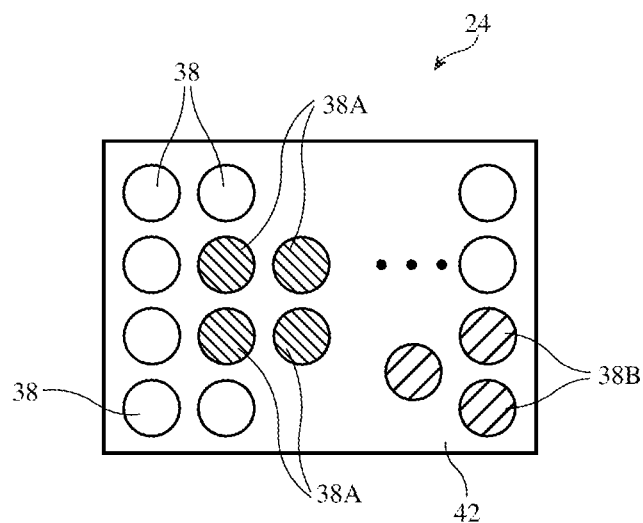
FIG. 11 is a top view of an illustrative array of ultrasonic transducers in which one or more clusters of ultrasonic transducers have the same center frequency for phase disambiguation assistance in accordance with an embodiment.

As shown in FIG. 11, some transducers 38 with the same center frequency may be placed adjacent to one another within array 24. For example, two, three or more transducers 38A may have the same center frequency and may be clustered together within array 24. If desired, one or more additional groups of transducers with the same center frequency such as transducers 38B may be clustered together within array 24 (the center frequency of transducers 38B and other groups of transducers used for phase disambiguation may be the same or different than the center frequency of transducers 38A). The close spacing of transducers with the same center frequency (e.g., transducers 38A, transducers 38B, and any other clusters of transducers used for phase disambiguation) helps disambiguate phase information by ensuring that the signals detected by transducers 38A occur close enough in time so that the true phase delay of an incoming signal can be determined. The remaining transducers 38 in array 24 that are not used for phase disambiguation may be spaced farther apart, as discussed in connection with FIG. 5. The example of FIG. 11 is merely illustrative, however. If desired, array 24 may not include any clusters of transducers with the same frequency.

The use of multiple transducers 38 in phased transducer array 24 allows beam steering arrangements to be implemented by controlling the relative phases and magnitudes (amplitudes) of the ultrasonic signals conveyed by the transducers. Control circuitry 26 may, for example, include phase shifter circuits and/or circuitry for adjusting the magnitude of the ultrasonic signals. The circuitry within control circuitry 26 that controls the phase and/or magnitude of drive signals for arrays 24 may sometimes be referred to as beam steering circuitry (e.g., beam steering circuitry that steers the beam of ultrasonic signals transmitted and/or received by phased transducer array 24).

Control circuitry 26 may adjust the relative phases and/or magnitudes of the transmitted signals that are provided to each transducer 38 in phased transducer array 24 and may adjust the relative phases and/or magnitudes of the received signals that are received by phased transducer array 24. Control circuitry 26 may, if desired, include phase detection circuitry for detecting the phases of the received signals that are received by phased transducer array 24. The term "beam" or "signal beam" may be used herein to refer to ultrasonic signals that are transmitted and/or received by phased transducer array 24 in a particular direction. The signal beam may exhibit a peak gain that is oriented in a particular pointing direction at a corresponding pointing angle (e.g., based on constructive and destructive interference from the combination of signals from each transducer in the phased transducer array). The term "transmit beam" may sometimes be used herein to refer to ultrasonic signals that are transmitted in a particular direction whereas the term "receive beam" may sometimes be used herein to refer to ultrasonic signals that are received from a particular direction.

Figure 12:
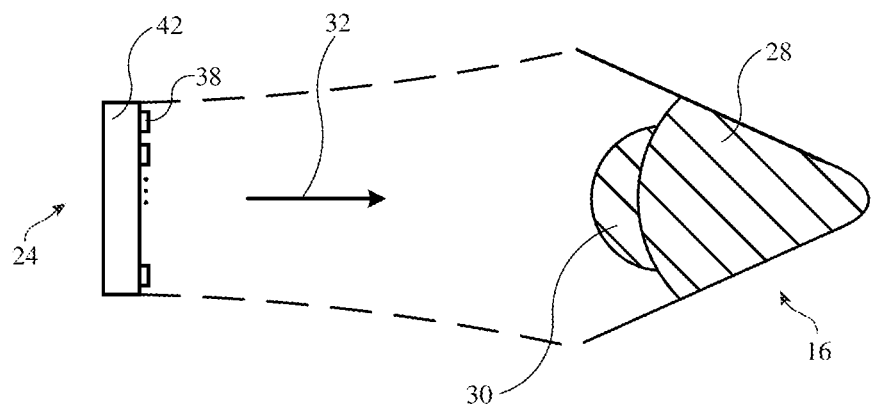
FIG. 12 is a side view of an illustrative phased array of ultrasonic transducers that may be adjusted using control circuitry to direct a beam of signals towards the cornea and sclera of the eyeball in accordance with an embodiment.
Figure 13:
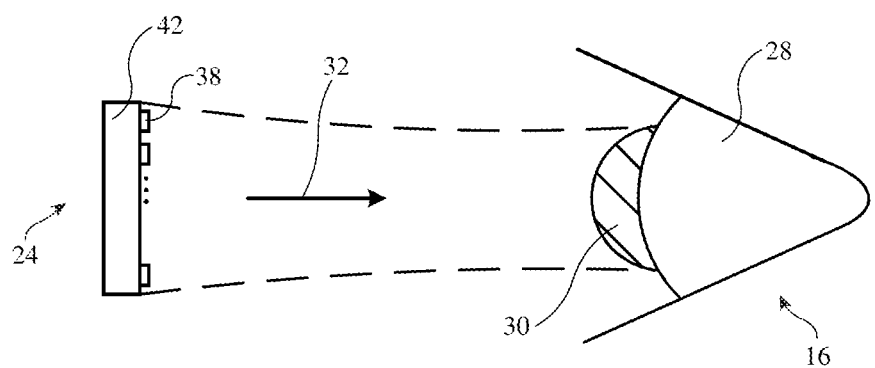
FIG. 13 is a side view of an illustrative phased array of ultrasonic transducers that may be adjusted using control circuitry to direct a beam of signals towards the cornea of the eyeball in accordance with an embodiment.

If, for example, control circuitry 26 provides control signals to transducers 38 to emit ultrasonic signals 32 having a first set of phases and/or magnitudes, the transmitted signals 32 may form a transmit beam that illuminates (i.e., covers) both the cornea 30 and sclera 28 of the user's eye 16, as shown in the example of FIG. 12. If control circuitry 26 provides control signals to transducers 38 to emit ultrasonic signals 32 having a second set of phases and/or magnitudes, the transmitted signals may form a transmit beam that is concentrated on the cornea 30 and not the sclera 28 of eye 16, as shown in the example of FIG. 13.

Control circuitry 26 may also operate array 24 to receive signals from a given range of angles. This may be achieved by adjusting the phase and magnitude of transducers 38 so that ultrasonic signals 32 are received from a particular direction. In other arrangements, this may be achieved post-measurement by changing the gain of signals received from a given region to amplify those signals relative to signals received from other regions.

If desired, control circuitry 26 may actively adjust control signals for transducers 38 in real time to steer the transmit or receive beam in different desired directions over time. For example, gaze tracking circuitry 20 may include a camera that captures images of the user's eye, which in turn may be used to determine the location of a glint on the user's eye. Control circuitry 26 may control arrays 24 based on eye information gathered with the camera so that beam shaping and beam steering can be performed accordingly (e.g., so that signals 32 are steered towards the location of the glint on the eye and/or received from the location of the glint on the eye). If desired, the ultrasonic signal beam may also be steered away from other arrays 24 (e.g., to avoid a scenario in which a receiving array 24 detects a signal that travels directly to the receiving array 24 from a transmitting array 24 without reflecting off the user).

During operation, control circuitry 26 may operate one or more arrays 24 as a transmitting array and one or more arrays 24 as a receiving array. For example, control circuitry 26 may control the phases of transducers 38 in a first array 24 (e.g., a transmitting array) to transmit a short pulse towards the user's eye and may control the phases of transducers 38 in a second array 24 (e.g., a receiving array) in a similar manner (e.g., such that the receiving array would generate the same short pulse if used for transmission). Control circuitry 26 may also, if desired, control the phases of the transmitting array 24 and the receiving array 24 to direct the ultrasonic signal beam to (or receive the ultrasonic signal beam from) an area of interest and thereby limit detected reflections from other areas. Active phasing may be achieved digitally or in analog. In digital phasing arrangements, control circuitry 26 may use a system clock to shift the time and phase of the driving signal to transducers 38. If desired, each transducer 38 may have an associated analog to digital converter circuit and phasing can be achieved computationally post-measurement.

Control circuitry 26 may, if desired, measure the actual resonance frequency of transducers 38 and may adjust drive signals for transducers 38 to compensate for any detuning that may occur in transducers 38 (e.g., detuning that may occur as a result of manufacturing effects or environmental conditions). This is merely illustrative. If desired, control circuitry 26 may not calculate or compensate for resonance frequency errors.

If desired, control circuitry 26 may phase the entire array 24 of transducers 38, combining all of the different center frequencies to form a short ultrasonic signal pulse. In other arrangements, control circuitry 26 may phase only transducers 38 in array 24 with the same center frequency. For example, each set of transducers 38 with the same center frequency in array 24 may be phased to produce an ultrasonic signal that illuminates the desired area and/or to receive an ultrasonic signal beam from a known range of angles. Control circuitry 26 may determine the phase and/or amplitude of the received signal from each set of phased transducers 38 with the same center frequency in array 24. Based on the phase and/or amplitude of the received signal at the different frequencies covered by array 24, control circuitry 26 may determine the time delay and/or phase delay of the emitted signal (and thus the location of the user's eye).

Figure 14:
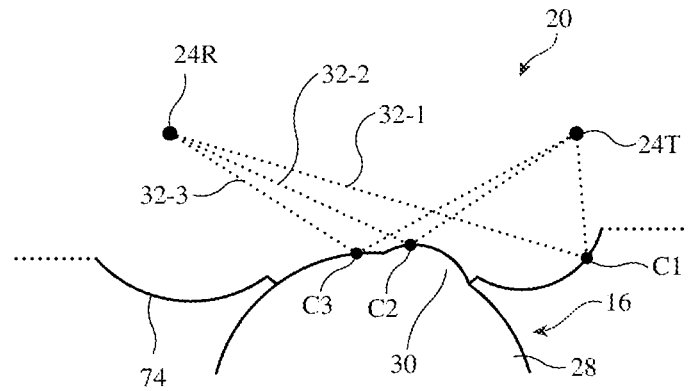
FIG. 14 is a top view of illustrative gaze tracking circuitry in which signals emitted by a first array of ultrasonic transducers are reflected by a user's eye and detected by a second array of ultrasonic transducers in accordance with an embodiment.

FIG. 14 is a top view of illustrative gaze tracking circuitry 20. In the example of FIG. 14, only two arrays 24 are shown, but there may be additional arrays 24 surrounding eye 16, if desired. During operation, control circuitry 26 may configure array 24T to be a transmitting array and array 24R to be a receiving array. Array 24T may include transducers 38 with different center frequencies such that the emitted ultrasonic signal beam includes signals with different frequencies. For example, the ultrasonic signal beam may include ultrasonic signal 32-1, ultrasonic signal 32-2, and ultrasonic signal 32-3. Signals 32-1, 32-2, and 32-3 may have different frequencies and/or may each include multiple frequencies (e.g., with different amplitudes). The ultrasonic signal beam may bounce off of one or more specular reflection points such as specular reflection points C1 (e.g., on the user's face 74), C2 (e.g., on cornea 30), and C3 (e.g., on sclera 28). Because transmitting array 24T is located a few centimeters away from the reflection points, control circuitry 26 may treat signals 32-1, 32-2, and 32-3 as originating from a point source (instead of originating from transducers at different locations), if desired. Control circuitry 26 may analyze signals 32-1, 32-2, and 32-3 received by array 24R to determine the location of reflection points C1, C2, and/or C3.

Figure 15:
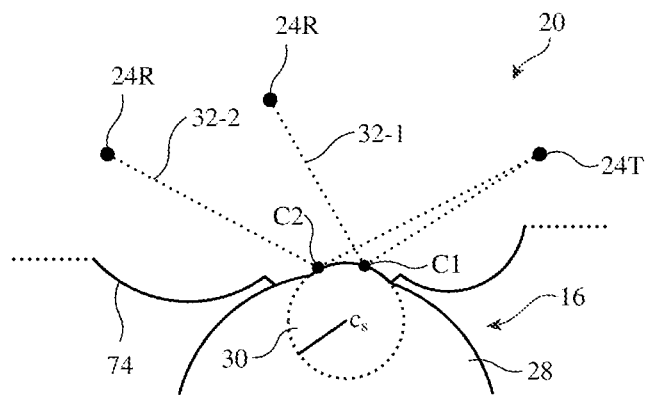
FIG. 15 is a top view of illustrative gaze tracking circuitry in which signals emitted by a first array of ultrasonic transducers are reflected by a user's eye and detected by multiple arrays of ultrasonic transducers in accordance with an embodiment.

FIG. 15 is a top view of illustrative gaze tracking circuitry 20 showing how multiple receiving arrays may be used to detect a reflected ultrasonic signal emitted from a single transmitting array. In the example of FIG. 15, only three arrays 24 are shown, but there may be additional arrays 24 surrounding eye 16, if desired. During operation, control circuitry 26 may configure array 24T to be a transmitting array and arrays 24R to be receiving arrays. Array 24T may include transducers 38 with different center frequencies such that the emitted ultrasonic signal beam includes signals with different frequencies. For example, the ultrasonic signal beam may include ultrasonic signal 32-1 and ultrasonic signal 32-2. Signals 32-1 and 32-2 may have different frequencies and/or may each include multiple frequencies (e.g., with different amplitudes). The ultrasonic signal beam may bounce off of one or more specular reflection points such as specular reflection points C1 (e.g., on cornea 30), and C2 (e.g., on sclera 28). Control circuitry 26 may analyze signals 32-1 and 32-2 received by arrays 24R to determine the location of reflection points C1 and/or C2.

If desired, control circuitry 26 may tune the transmission properties (e.g., phases and/or amplitudes) of array 24T to reduce the amplitude of signals directly transmitted from transmitting arrays 24T to receiving arrays 24R. In the event that direct transmission from transmitting arrays 24T to receiving arrays 24R remains too large, one or more additional transmitting arrays 24T may be used to transmit a signal (e.g., steered away from the user's eye) that partially or completely nullifies the direct transmission from transmitting arrays 24T to receiving arrays 24R, if desired.

Cornea 30 and sclera 28 may be approximately spherical. If desired, control circuitry 26 may determine the locations of reflection points C1 and/or C2 as a function of the sphere center and/or sphere radii of cornea 30 and/or sclera 28. For example, the location of reflection point C1 may be determined as a function of cornea center $c_s$.

Figure 16:
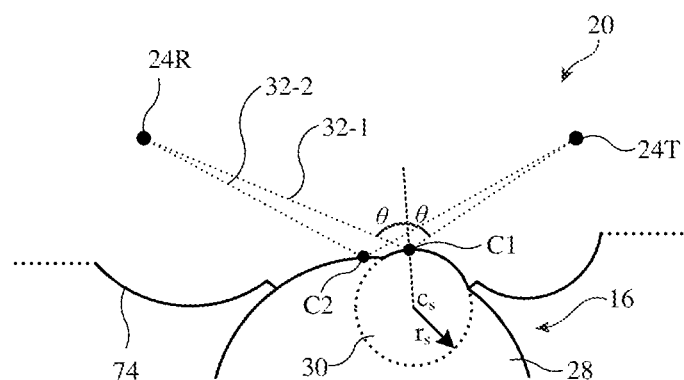
FIG. 16 is a top view of illustrative gaze tracking circuitry in which signals emitted by a first array of ultrasonic transducers are reflected by a user's eye and detected by a second ultrasonic transducer to determine a center location of the user's cornea in accordance with an embodiment.

FIG. 16 is a top view of illustrative gaze tracking circuitry 20 showing how a single transmitting array and a single receiving array may be used to determine a location of the center of the cornea. In the example of FIG. 16, only two arrays 24 are shown, but there may be additional arrays 24 surrounding eye 16, if desired. During operation, control circuitry 26 may configure array 24T to be a transmitting array and array 24R to be a receiving array. Array 24T may include transducers 38 with different center frequencies such that the emitted ultrasonic signal beam includes signals with different frequencies. For example, the ultrasonic signal beam may include ultrasonic signal 32-1 and ultrasonic signal 32-2. Signals 32-1 and 32-2 may have different frequencies and/or may each include multiple frequencies (e.g., with different amplitudes). The ultrasonic signal beam may bounce off of one or more specular reflection points such as specular reflection points C1 (e.g., on cornea 30) and C2 (e.g., on sclera 28). When approximating the cornea as a spherical shape, a bisecting line separating equal angles θ between the emitted signal path and the reflected signal path (reflected from point C1, for example) will pass through the cornea center location $c_s$. If the radius $r_s$ of cornea 30 is known, control circuitry 26 may analyze signals 32-1 and 32-2 received by array 24R to determine the location of cornea center $c_s$. Control circuitry 26 may use the cornea radius $r_s$ and cornea center location $c_s$ to solve for the gaze direction.

The examples of FIGS. 14, 15, and 16 are merely illustrative. If desired, control circuitry 26 may employ other techniques to gather information about the user's eye during operation of glasses 14. For example, control circuitry 26 may combine path length information from several reflection paths off of the cornea and/or sclera to determine gaze angle. This technique may be advantageous in situations where path length can be measured with more precision than the incident angle of the reflected signal.

The foregoing is merely illustrative and various modifications can be made to the described embodiments. The foregoing embodiments may be implemented individually or in any combination.

What is claimed is:

1. Eyeglasses configured to be worn by a user, the eyeglasses comprising:
   at least one adjustable lens that aligns with a respective one of the user's eyes;
   gaze tracking circuitry that gathers gaze information, wherein the gaze tracking circuitry comprises an array of ultrasonic transducers operating at different center frequencies; and
   control circuitry that controls the adjustable lens based on the gaze information.

2. The eyeglasses defined in claim 1 wherein the array of ultrasonic transducers is one of multiple arrays of ultrasonic transducers that are distributed around the user's eyes.

3. The eyeglasses defined in claim 1 wherein the array of ultrasonic transducers comprises piezoelectric micromachined ultrasonic transducers.

4. The eyeglasses defined in claim 1 wherein the array of ultrasonic transducers comprises capacitive micromachined ultrasonic transducers.

5. The eyeglasses defined in claim 1 wherein the array of ultrasonic transducers comprises at least three ultrasonic transducers having respective first, second, and third center frequencies that are different from one another.

6. The eyeglasses defined in claim 1 wherein the array of ultrasonic transducers comprises a phased array of ultrasonic transducers.

7. The eyeglasses defined in claim 1 wherein the array of ultrasonic transducers share a common substrate.

8. The eyeglasses defined in claim 1 wherein the array of ultrasonic transducers comprises at least one set of ultrasonic transducers with the same center frequency that are located adjacent to one another within the array.

9. The eyeglasses defined in claim 1 wherein the transducers in the array with different center frequencies have different cavity depths in a common substrate.

10. The eyeglasses defined in claim 1 wherein the transducers in the array with different center frequencies have cavities with different surface features in a common substrate.

11. Gaze tracking circuitry, comprising:
a first array of ultrasonic transducers on a first substrate, wherein the first array includes at least first and second ultrasonic transducers that operate at respective first and second different frequencies and wherein the first array emits an ultrasonic signal beam towards a user's eye;
a second array of ultrasonic transducers on a second substrate, wherein the second array comprises at least third and fourth ultrasonic transducers that operate respectively at third and fourth different frequencies and wherein the second array detects the ultrasonic signal beam after it reflects from the user's eye; and
control circuitry that gathers sensor data from the first and second arrays of ultrasonic transducers and that determines at least one of a distance and direction to the user's eye based on the sensor data.

12. The gaze tracking circuitry defined in claim 11 wherein the first array of ultrasonic transducers comprises a phased array of ultrasonic transducers.

13. The gaze tracking circuitry defined in claim 12 wherein the control circuitry adjusts phases of the ultrasonic transducers in the first array to steer the ultrasonic signal beam towards the user's eye.

14. The gaze tracking circuitry defined in claim 13 wherein the second array of ultrasonic transducers comprises a phased array and wherein the control circuitry adjusts phases of the ultrasonic transducers in the second array so that the second array receives the ultrasonic signal beam from a direction of the user's eye.

15. The gaze tracking circuitry defined in claim 11 wherein the control circuitry measures at least one of a time delay and a phase delay associated with the ultrasonic signal beam.

16. A sensor, comprising:
a substrate;
an array of micromachined ultrasonic transducers on the substrate, wherein the array comprises at least first, second, and third micromachined ultrasonic transducers with respective first, second, and third different center frequencies; and
control circuitry that determines a distance to an object using the array of micromachined ultrasonic transducers.

17. The sensor defined in claim 16 wherein the first micromachined ultrasonic transducer has a bandwidth that is larger than a gap between the first and second center frequencies.

18. The sensor defined in claim 16 wherein the first micromachined ultrasonic transducer has a bandwidth that is smaller than a gap between the first and second center frequencies.

19. The sensor defined in claim 16 wherein the control circuitry independently controls the first, second, and third micromachined ultrasonic transducers to emit a combined ultrasonic signal pulse.

20. The sensor defined in claim 19 wherein the first, second, and third center frequencies are between 500 kHz and 1.25 MHz.

* * * * *